United States Patent [19]
Sprague et al.

[11] Patent Number: 5,842,629
[45] Date of Patent: Dec. 1, 1998

[54] VERI MAG PACK

[76] Inventors: William R. Sprague, 133 Westminster Pike, Reisterstown, Md. 21136; Steven W. Sprague, 7908 Tressel Ct., Severn, Md. 21144

[21] Appl. No.: 694,597

[22] Filed: Aug. 9, 1996

[51] Int. Cl.$^6$ ............................................. B65D 27/04
[52] U.S. Cl. ........................... 229/71; 206/449; 229/92.3; 229/92.8; 283/101; 283/901
[58] Field of Search ..................... 283/901, 81, 101; 229/69, 92.1, 92.8, 92.9, 71, 72, 92.3; 206/449

[56] References Cited

U.S. PATENT DOCUMENTS

| | | | |
|---|---|---|---|
| 2,209,601 | 7/1940 | Heywood | 229/71 |
| 2,860,826 | 11/1958 | Cooke | 229/72 |
| 3,508,702 | 4/1970 | Kaiser | 229/71 |
| 3,726,471 | 4/1973 | Kalb | 229/92.8 |
| 3,773,251 | 11/1973 | Hadick | 229/92.8 |
| 3,838,808 | 10/1974 | Schroeder | 229/72 |
| 3,999,700 | 12/1976 | Chalmers | 229/71 X |
| 4,034,210 | 7/1977 | Hill et al | 229/92.8 X |
| 4,887,763 | 12/1989 | Sano | 229/71 |
| 5,294,041 | 3/1994 | Whiteside | 229/69 |
| 5,376,048 | 12/1994 | Whiteside | 229/92.1 X |
| 5,427,832 | 6/1995 | Longtin | 229/69 X |
| 5,495,981 | 3/1996 | Wartler | 229/71 |
| 5,609,253 | 3/1997 | Goade, Sr. | 206/449 X |

*Primary Examiner*—Bryon P. Gehman

[57] ABSTRACT

The invention is a "VERI MAG PACK," a package that protects the magnetic stripe and PIN of a data card from unauthorized access from manufacture to the point of sale while allowing the retail sales clerk to have quick, easy access to the magnetic stripe at the time of sale. When the bottom perforated portion of the packet is removed, without destroying the integrity of the packet, the magnetic stripe is revealed to the sales person to swipe through a magnetic card reader to verify, activate, and register the card. The PIN remains inside the packet and not accessible to the sales person. Only the customer will see the PIN. The PIN and data card instructions are accessible when the perforated top and right sides of the packet are removed by the customer.

4 Claims, 7 Drawing Sheets

VERI MAG PACK

BACKGROUND OF THE INVENTION

1. Field of the Invention

This invention relates to the improved design, construction, and security of packaging for a data card with an encoded magnetic stripe ("data card"), such as a telephone card, that provides security for the encoded data and a printed Personal Identification Number (PIN), a quick release feature to expedite point of purchase processing, packaging with a front and back plus a large area inside the package for printed telephone rate information, instructions for use, or advertisements, as applicable, and an economical way to print this information.

2. Description of the Prior Art

There are limited data card holders that secure a magnetic stripe card to a cardboard backing, blister pack, inserted in envelopes, etc., but they do not protect the data card with a magnetic stripe in a secure pocket and still provide a simplified quick release feature that retains the data card in the packet while exposing only the magnetic stripe (and not the PIN). This feature permits the sales clerk to swipe the card through a magnetic reader to verify, activate, and register the PIN, while still maintaining the integrity of the packet.

SUMMARY OF THE INVENTION

Pilferage of the confidential PIN on the back of a data card is one of the most serious problems in data card retail sales. The primary object of our invention is to provide packaging that will protect the security and confidentiality of encoded data on a magnetic stripe and PIN on the back of a data card and provide immediate simple access to the magnetic stripe by a retail sales clerk without damaging the integrity of the packaging or exposing the PIN printed on the back of the data card. Our invention, titled the VERI MAG PACK (VMP or "the pack"), is a Verification Magnetic Stripe Pack that accomplishes this purpose. The VMP includes a data card glued inside a transparent cellophane window on the lower portion of the pack. The magnetic stripe is kept secure until the quick release feature is used. The bottom perforated portion of the data card pack is removed exposing the magnetic stripe portion of the data card but not the printed PIN, and the data card remains glued to the pack. A retail sales clerk can then pass the magnetic stripe on the data card, that is still attached to the pack, through a magnetic reader at the point of purchase, validating and activating the encoded data and the PIN, without access to the printed PIN. The pack is sold to a customer who is the only one who can access the printed PIN without destroying the packaging. The purchaser removes the top and side perforated edges from the VMP, and folds it open like a book exposing the PIN printed on the top portion of the back of the data card, and telephone rate information, instructions for use, or advertisements, as applicable, printed on the inside of the pack.

Further objects of our invention are to provide a data card packaging design that can be printed economically and to provide a substantial area inside the packaging for printing of text materials, such as telephone rate information, instructions for use, or advertisements, as applicable.

DESCRIPTION OF THE PREFERRED EMBODIMENTS

Figure 1:
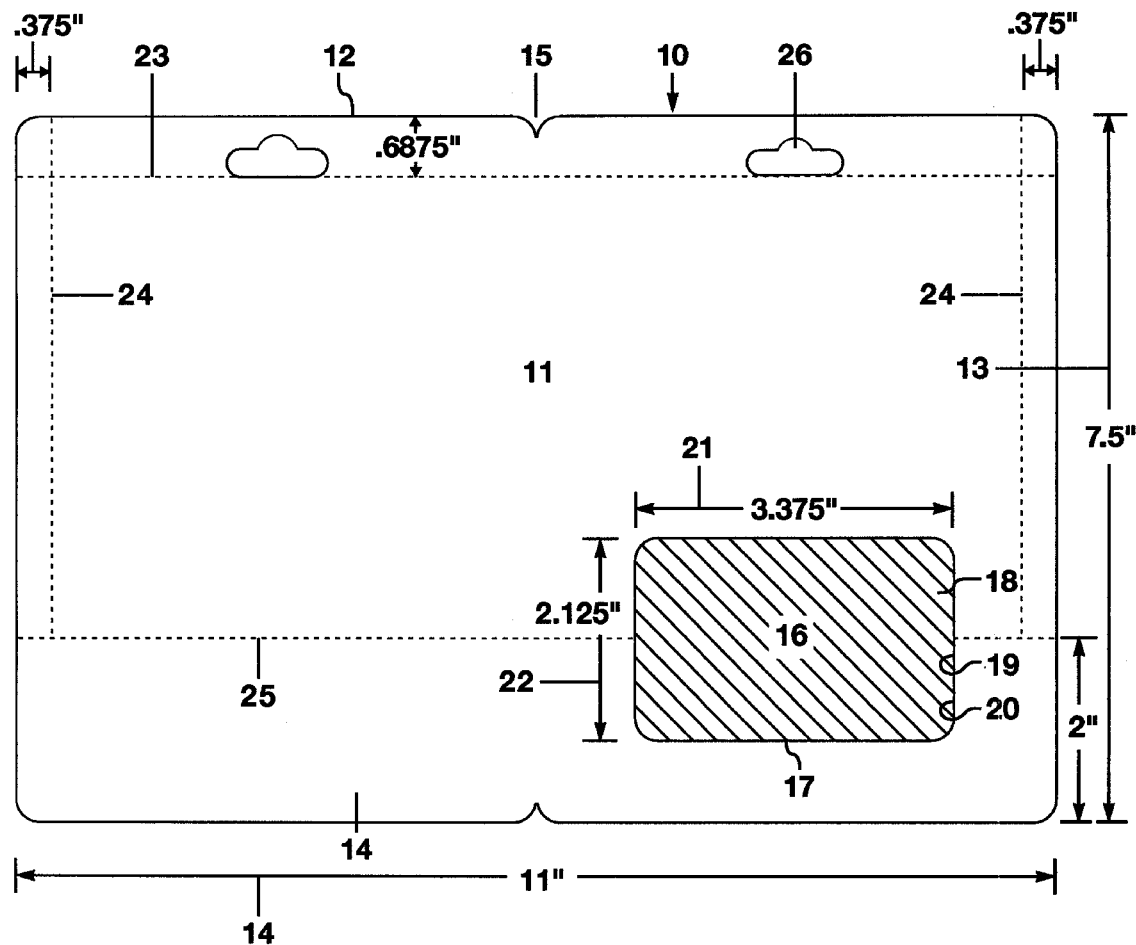
FIG. 1 is a drawing of the 11"×7.5" ten to twenty point one-piece opaque board packaging that when folded, becomes the front and back sides of our 5.5"7.5" packaging invention, titled the VERI MAG PACK (VMP or "the pack"). At the top of the pack is a diecut hanger hole for retail sales display. A 3.375"×2.125" diecut transparent cellophane window designed to display and hold a data card is
Figure 2:
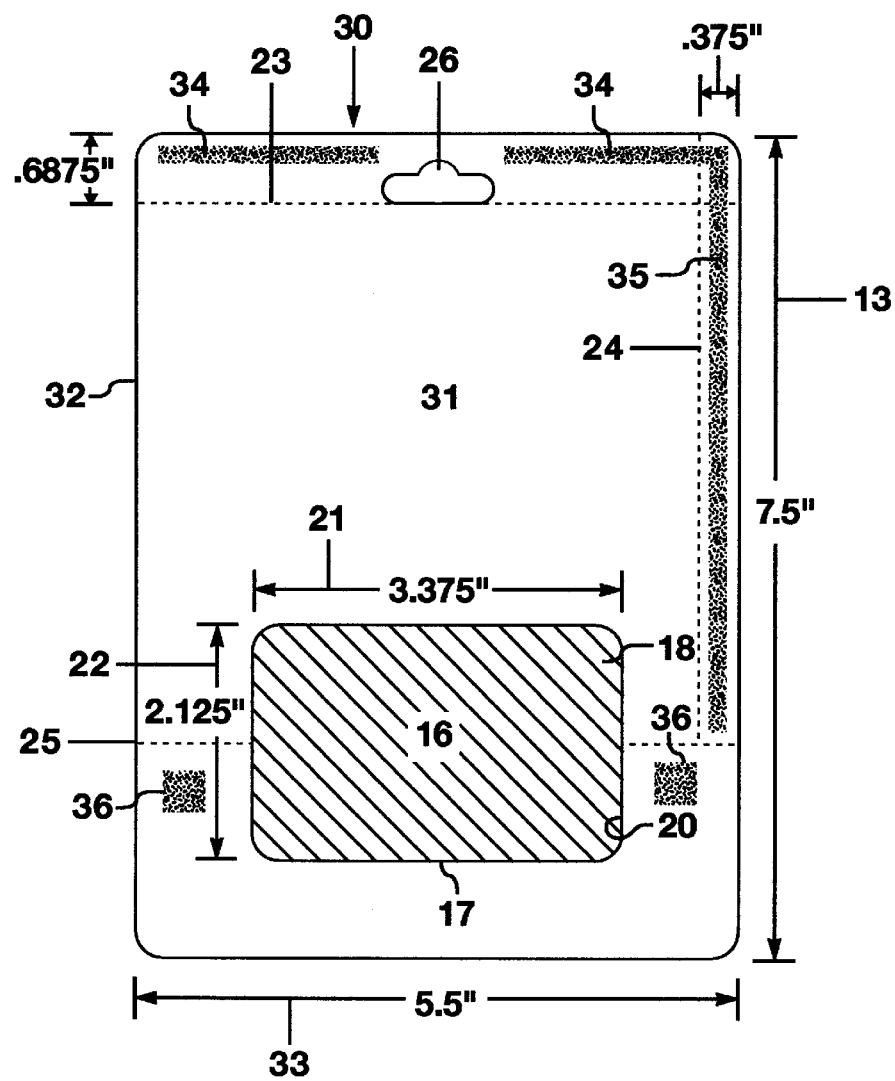
FIG. 2 is the completed front view of the VERI MAG PACK It is now folded and sealed (glued) and perforated to form the completed pack. The figure shows a diecut hanger hole for retail sales display at the top and a diecut transparent cellophane window designed to hold a data card at the bottom. The perforation at the bottom is to allow quick access to the magnetic stripe but does not reveal the PIN. The top and side perforations are provided so that the pack can fold open like a book giving the purchaser easy access to the PIN printed on the upper portion of the back side of the data card, and a list of telephone rate information, instructions for use, or advertisements, as applicable, printed on the inside of the pack.
Figure 3:
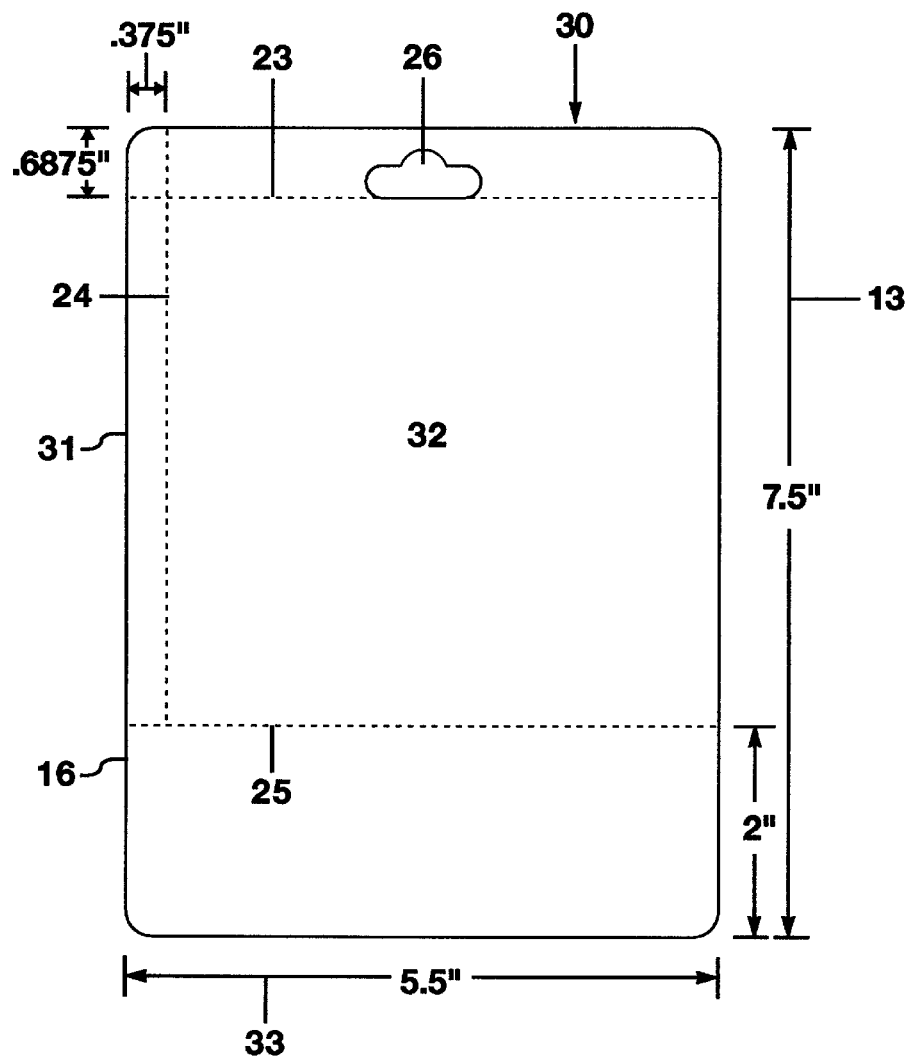
FIG. 3 is a completed back view of the VERI MAG PACK. It shows the diecut hanger hole, the perforated edges and bottom perforations of the pack for easy access to the data card magnetic stripe and printed material.

FIG. 1 is an illustration of a ten to twenty point one-piece opaque paper board packaging 10 (7.5"×11") from which the VERI MAG PACK (VMP or "the pack") 30 is constructed with a first side (exterior) 11 and a second side (interior) 12, length 13, and width 14. When folded in half along folding points 15 and glued, the packaging 10 becomes the final-sized VMP 30 (see FIG 2), the right side of the packaging 10 becomes the front side 31 and the left side becomes the back side 32 of the VMP 30 with a length 13 and width 33 (7.5"×5.5"). FIG. 2 shows the front side 31 and FIG. 3 shows the back side 32 of the VMP 30. A diecut transparent cellophane window 16 glued and covering a data card 17 with a front side 18, back side 19, magnetic stripe 20, length 21, width 22 (see FIG. 4 and FIG. 5). Perforations are shown on three sides of the packaging 10, top side 23, right side 24, bottom 25, to facilitate quick access to the data card 17 and the printed information on the inside of the VMP 30. The quick release of the bottom 25 perforated area of the VMP 30 reveals the magnetic stripe 20 on the bottom half of the back of the data card 17 that a retail sales clerk can pass through a magnetic reader at the point of purchase and electronically verify and activate the encoded data and PIN 39 (see FIG. 4 and FIG.5) on the data card 17. The PIN 39 on the data card is not valid until verified and activated thus increasing and protecting the security of the encoded data until purchased. The PIN 39 is not seen by anyone between manufacture and purchase, until a purchaser opens the packaging. When all the perforations, top side 23, right side 24, and bottom side 25 of the VMP 30 are removed, the pack opens like a book (see FIG. 6) releasing the data card 17 and displaying an area of 7.5"×11" available for printed text such as telephone rate information, instructions for use, or advertisements applicable to the data card 17.

The one-piece paperboard construction of the VMP packaging 10 permits the four-color printing of the entire first side (exterior) 11 (the actual front side 31 and back side 32 of the completed VMP 30 as described above) in one single pass of a printing press rather than the two separate passes required to print a two-piece exterior package resulting in savings for the manufacturer of the VMP. The same savings is realized when printing the second side (interior) 12 of the VMP (see FIG. 7). This interior, with an area of 7.5"×11" available for printed text as described above, can also be printed in one pass of a printing press instead of the two separate passes required to print a two-piece interior package.

The diecut hanger hole 26 at the top of the packaging 10 and VMP 30 is provided for the display of the pack at a retail location.

FIG. 2 shows the completed VMP 30 with a front side 31 and a back side 32, a length 13 and width 33, interior glue spots, top side 34, right side 35, and bottom 36 that seals the front side 31 and back side 32 of the VMP 30 by sandwiching the data card 17 and the diecut transparent cellophane window 16 to the opaque interior of the VMP protecting, yet permitting the exposure of the front side 18 of, the data card 17 that is sandwiched between the diecut transparent cellophane window on the front side 31 and back side 32 of the VMP 30. Perforations on the top side 23, right side 24, and bottom 25 permit quick opening of the VMP for easy access to the data card 17. The bottom 25 perforation is removed to gain access to the magnetic stripe 20 for passing through a magnetic reader for immediate verification and activation of the encoded data and PIN 39 (see FIG. 4 and FIG. 5). The front side 31 of the VMP 30 as shown in this figure is generally printed with a multi-color company logo, graphics, or advertising information.

FIG. 3 shows the back side 32 of the completed VMP 30 with a length 13, width 33, perforations on the top side 23, right side 24, and bottom 25, diecut hanger hole 26 at the top of the pack. The back side 32 is made of opaque paper board that completely covers the back 19 of the data card 17 that is sandwiched in the middle of the VMP 30 thus protecting the security of the encoded data on the magnetic stripe 20 and PIN 39 on the back 19 of the data card 17 while permitting a view of the front side 18 of the data card 17 through the diecut transparent cellophane window 16 for advertising purposes. Thus the printed PIN 39 cannot be read unless the perforated areas are removed, which would result in a damaged package, and if the PIN 39 was exposed, the data card could not be used because the PIN 39 would not have been verified or activated. This a significant improvement in the security of the PIN 39 not found in similar packaging. The PIN is not viewed by any individual from manufacture of the pack until the packaging is opened by the purchaser.

Figure 4:
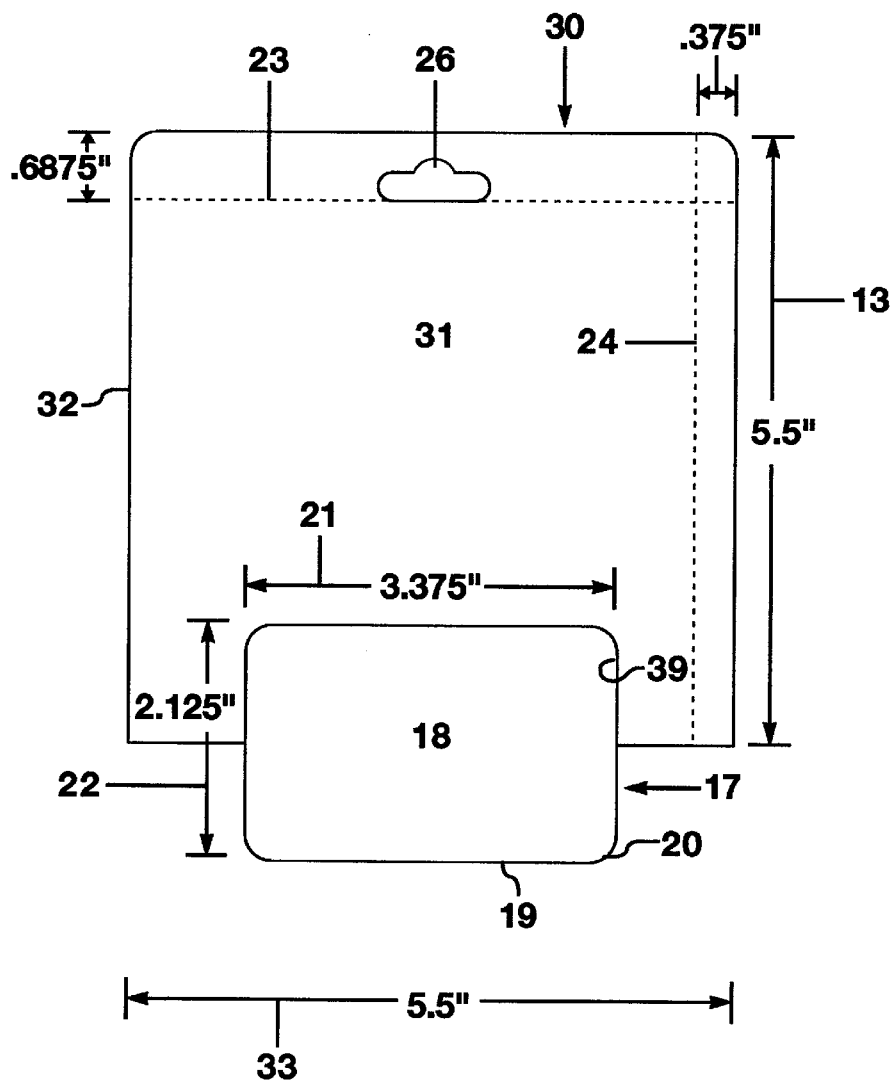
FIG. 4 is a cut-away front view of the VERI MAG PACK. In this view, one-half of the front of the data card is exposed. The data card remains glued to the upper portion of the pack protecting the PIN when the bottom perforation is removed thus maintaining the integrity of the pack.

FIG. 4 shows the front side 31 of the VMP 30, length 13, width 33, with the bottom 25 perforated area removed, diecut hanger hole 26, perforated top 23, right side 24, with one-half of the front side 18 of the data card 17 exposed. The magnetic stripe 20 is located on the back side 19 of the data card 17 (see FIG. 5). In this configuration, the data card 17 is ready to pass through the magnetic reader for verification and activation of the encoded data and PIN 39. The VMP 30 is also manufactured in this configuration without the bottom 25 perforated portion exposing the magnetic stripe 20 to further expedite point of purchase processing while protecting the integrity of the PIN 39.

Figure 5:
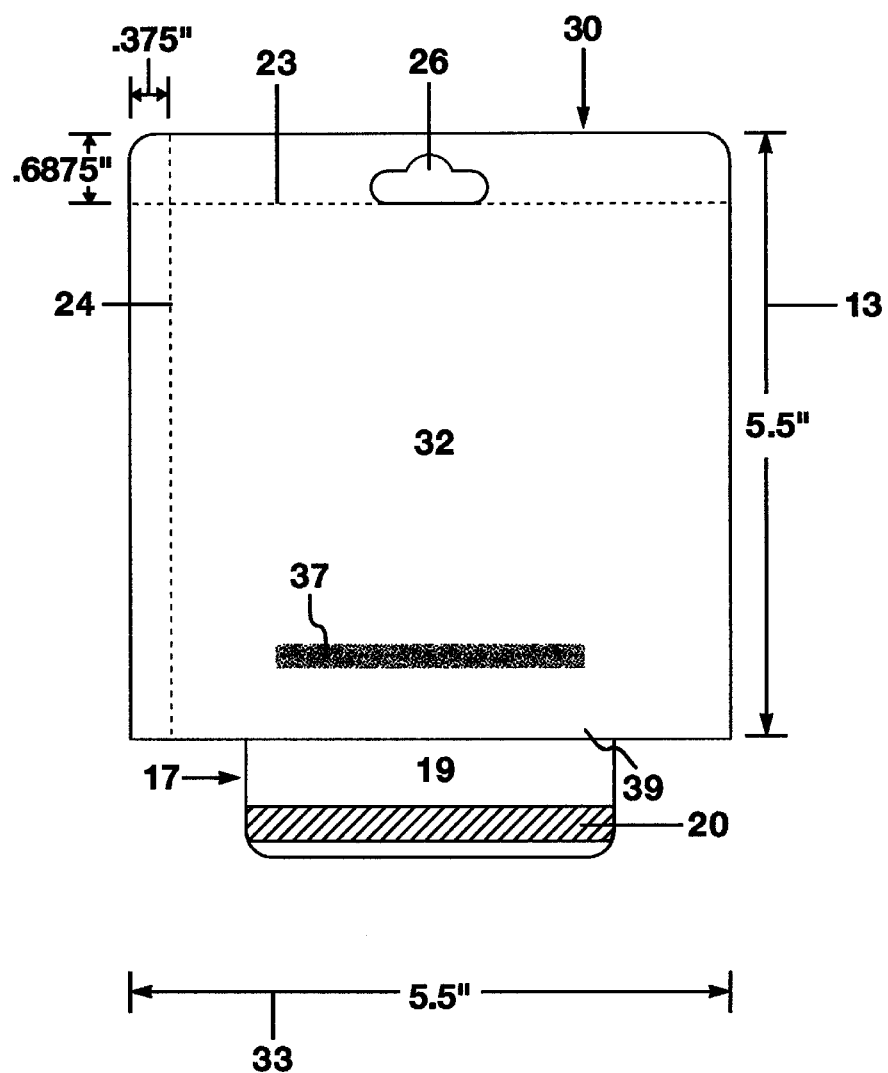
FIG. 5 is a cut-away back view of the VERI MAG PACK. It shows the bottom portion of the back side of the data card with the magnetic stripe exposed. In this position, the magnetic stripe is passed through a magnetic reader to verify and activate the PIN. The PIN printed on the top portion of the back side of the data card remains hidden. The data card remains securely attached to the upper portion of the pack with adhesive maintaining the integrity of the pack. It also shows the diecut hanger hole and the top and side perforated edges.

FIG. 5 shows the back side 32 of the VMP 30, length 13, width 33, with the bottom 25 perforated portion removed, putting the magnetic stripe 20 of data card 17 in a position to be passed through a magnetic reader for verification and activation of the encoded data and PIN 39. The perforations at the top 23 and right side 24 are sealed but when removed expose the entire data card 17 and telephone rate information, instructions for use, or advertisements on the second side (interior) 12 of the VMP 30. One of the glue strips 37 that adheres the data card 17 to the second side (interior) 12 of the pack is also shown. A diecut hanger hole 26 is provided for retail display purposes.

Figure 6:
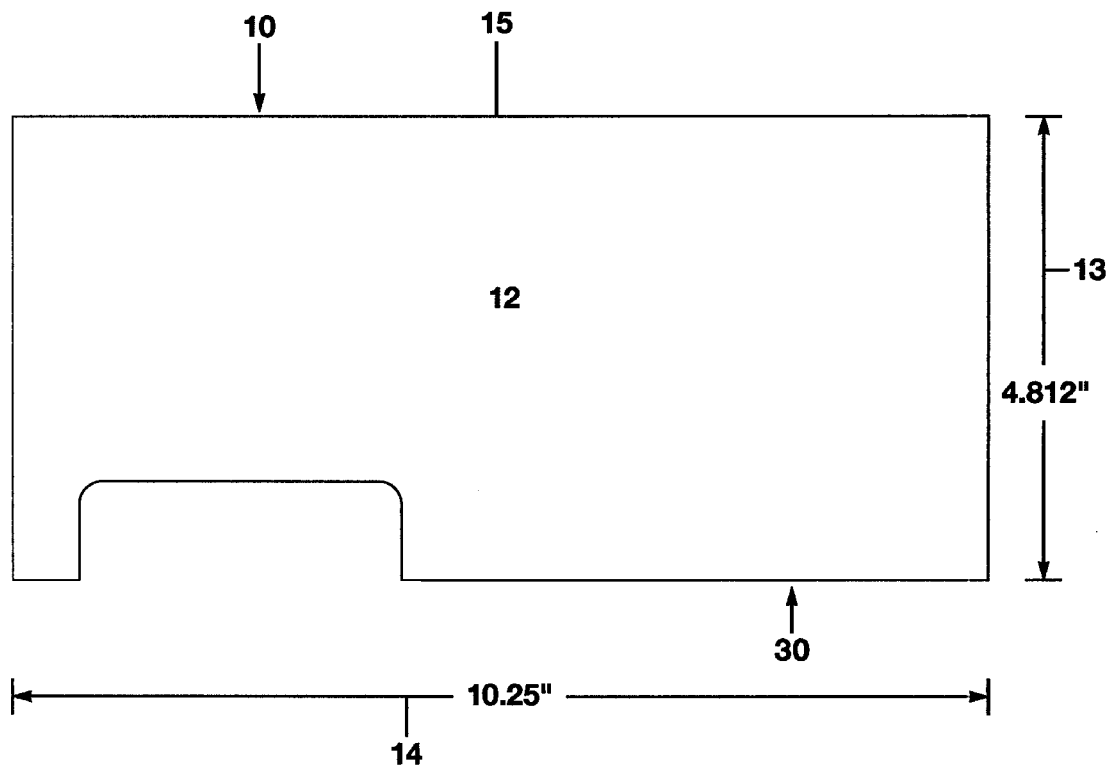
FIG. 6 is the inside view of the VERI MAG PACK, which measures 10.25"×5.5" after the top and side perforated edges and the data card are removed by the purchaser. This provides an area that can be used by the manufacturer to print telephone rate information, instructions for use, or advertisements, as applicable.

FIG. 6 illustrates the second side (interior) 12 of the packaging 10 of the VMP 30, length 13, width 14, with a diecut transparent cellophane window 16 removed. The VMP 30 with perforations, top side 23, right side 24, and bottom 25 removed and unfolded like a book at folding point 15 revealing the second side (interior) 12 that is also the interior of the VMP 30 with an area of 7.5"×11" available for printed text, such as telephone rate information, instructions for use, or advertisements, as applicable. The bottom 25 perforated portion and data card 17 are removed. The entire one-piece second side (interior) 12 is economically printed in one pass of a printing press instead of the two separate passes required to print a two-piece interior package. Most similar packaging does not provide such a large area, if any, for printed advertising and instructional information. This is a significant improvement in data card packaging.

Figure 7:
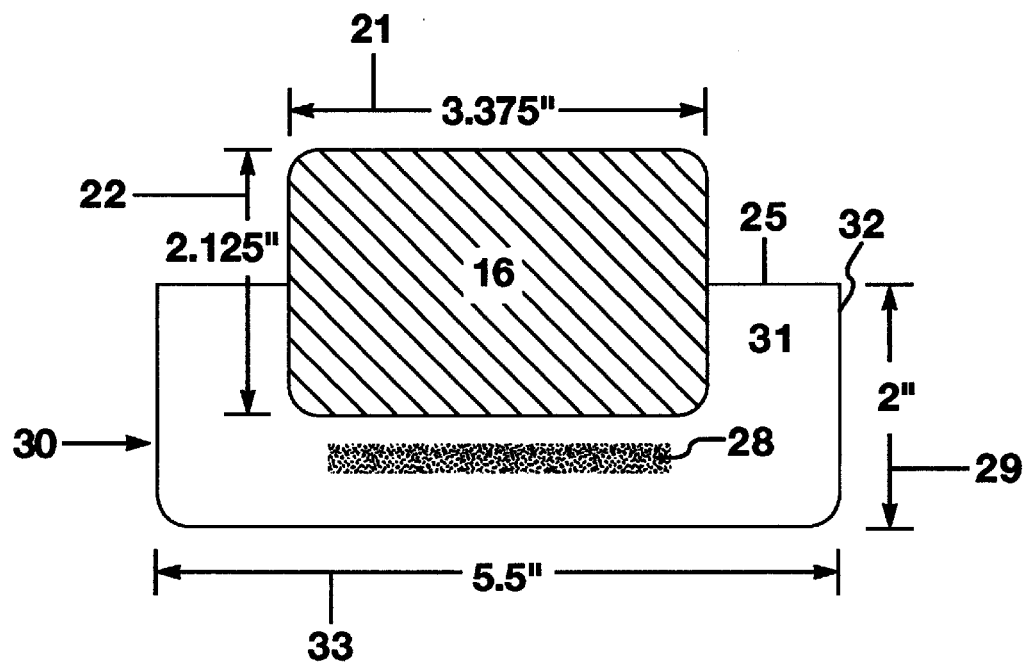
FIG. 7 is the bottom, 5.5"×2", quick release, disposable portion of the VERI MAG PACK with the diecut transparent cellophane window attached, which when removed, exposes the bottom half of the data card and the magnetic stripe.

FIG. 7 shows the bottom 25 perforated two-inch portion 29 of the VMP 30 with a diecut transparent cellophane window 16 after it is detached from the VMP 30 and a glue strip 28 that helps hold the front side 31 and back side 32 of VMP 30 together and secures and seals the data card 17 to protect the encoded data.

What is claimed:

1. A data card display pack for displaying and viewing a data card having confidential data on its back side, the display pack comprising an opaque back for covering the confidential data on the back of the data card and the front of the display pack having a diecut transparent cellophane window that permits viewing of the front of the data card, the display pack comprising:

a package constructed of a one-piece ten to twenty point board that is printed with a four-color exterior-forming first side and a one-color interior-forming second side, the board being folded, sealed and perforated to form the package having a four-color exterior front and back, a one-color interior, a top, left and right sides and a bottom;

a data card with a magnetic stripe of encoded data and a confidential personal identification number (PIN)

printed on the back side of the data card, and nonconfidential data printed on the front side of the data card, the card being located for the front side to be viewed through the diecut transparent cellophane window disposed in the front of the package;

an adhesive that seals the data card in the diecut transparent cellophane window and the interior of the package, with additional adhesive also disposed at the top, right side and bottom of the package to seal the folded board to form the package, a line of perforations at each of the top, right side and bottom of the package, the bottom line of perforations intersecting the diecut transparent cellophane window to provide a quick release feature that exposes a portion of the data card and the magnetic stripe for verification and activation of the encoded data while the data card remains adhesively secured in the display pack and covering the confidential PIN on the back of the data card, further separation of the perforations at the top and right side permits the package to unfold to reveal a printed interior of one of telephone rates, instructions for use, and advertisements.

2. The data card display pack of claim 1, further including a diecut hanger hole provided for retail display.

3. A data card display pack for displaying and viewing a data card having confidential data on its back side, the display pack comprising an opaque back for covering the confidential data on the back of the data card and the front of the display pack having a diecut transparent window that permits viewing of the front of the data card, the display pack comprising:

a package constructed of board with an exterior-forming first side and an interior-forming second side, the board being folded sealed and perforated to form the package having an exterior front and back, an interior, a top, left and right sides and a bottom;

a data card with a magnetic stripe of encoded data and a confidential personal identification number (PIN) printed on the back side of the data card, and nonconfidential data printed on the front side of the data card, the card being located for the front side to be viewed through the diecut transparent window disposed in the front of the package;

an adhesive that seals the data card in the diecut transparent window and the interior of the package, with additional adhesive also disposed at the top, right side and bottom of the package to seal the folded board to form the package, a line of perforations at each of the top, right side and bottom of the package, the bottom line of perforations intersecting the diecut transparent window to provide a quick release feature that exposes a portion of the data card and the magnetic stripe for verification and activation of the encoded data while the data card remains adhesively secured in the display pack and covering the confidential PIN on the back of the data card, further separation of the perforations at the top and right side permits the package to unfold to reveal a printed interior.

4. The data card display pack of claim 3, further including a diecut hanger hole provided for retail display.

* * * * *